2,791,100

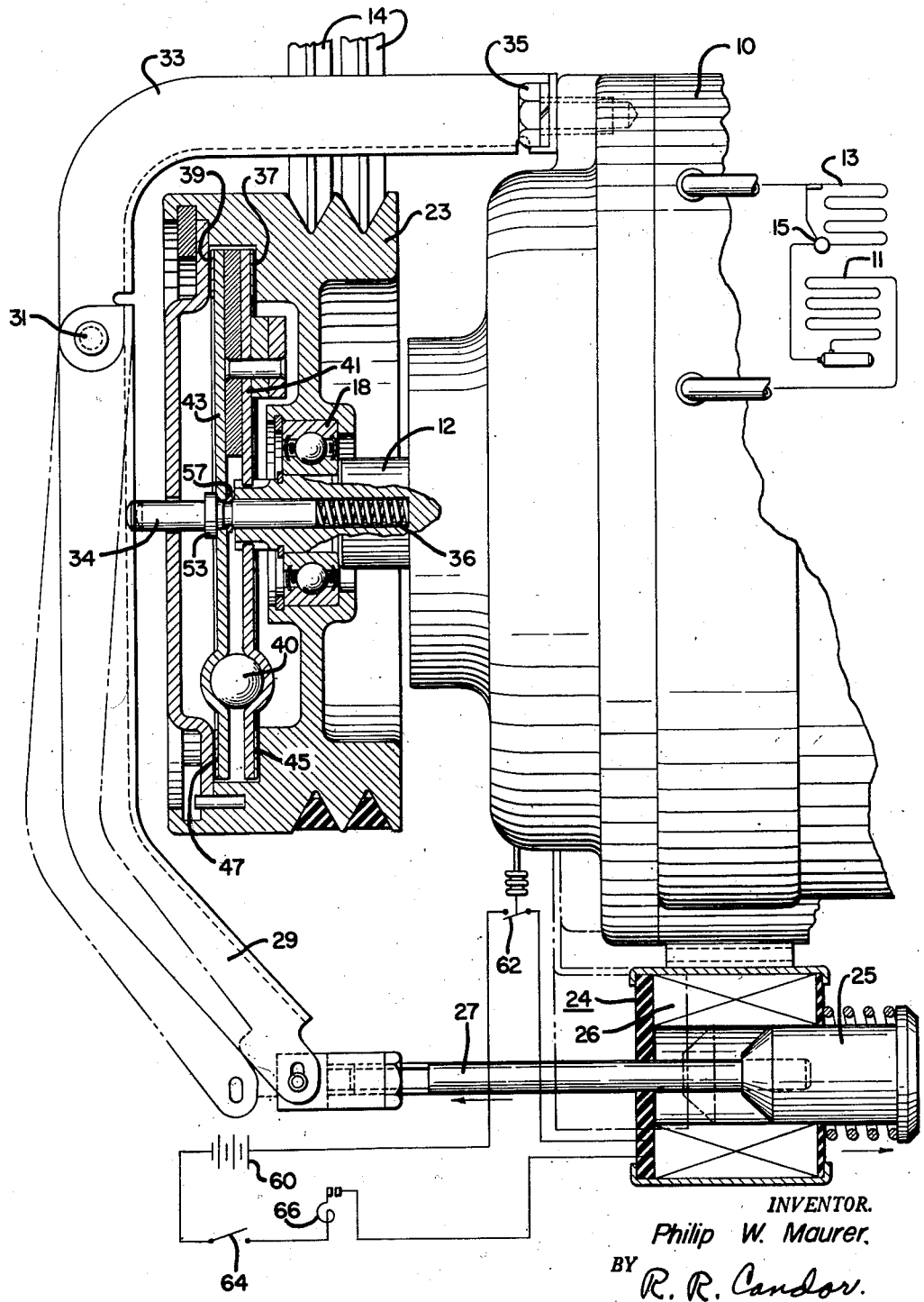

VEHICLE REFRIGERATING APPARATUS

Philip W. Maurer, Dearborn, Mich., assignor to General Motors Corporation, Detroit, Mich., a corporation of Delaware Application August 26, 1953, Serial No. 376,604

3 Claims. (Cl. 62—4)

This invention relates to refrigerating apparatus and more particularly to a solenoid operated clutch for use in an automobile air conditioning system.

It is an object of this invention to provide a simple and inexpensive arrangement for use in declutching a refrigerant compressor from the main car engine drive shaft.

More particularly it is an object of this invention to so arrange the clutch and its operating solenoid as to produce a substantially unitary device which does not materially interfere with removing the belts which transmit power from the car engine to the drive pulley of the clutch.

Further objects and advantages of the present invention will be apparent from the following description, reference being had to the accompanying drawings, wherein a preferred form of the present invention is clearly shown.

The sole figure in the drawing is a fragmentary elevational view partly in section showing the relationship between the compressor, the clutch and the clutch operating solenoid as well as schematically showing the refrigerant circuit and the electrical control circuit.

Referring now to the drawing wherein a preferred embodiment of the invention has been shown, reference numeral 10 generally designates a refrigerant compressor having a drive shaft 12 projecting from the one end of the compressor as shown. The compressor is connected in refrigerant flow relationship with a condenser 11 and an evaporator 13 in accordance with standard practice. A conventional thermostatic expansion valve 15 controls the flow of refrigerant to the evaporator which is arranged to cool air for the passenger compartment of a car. Power for operating the compressor 10 is adapted to be supplied from any suitable source such as the main car engine, not shown, through a pair of belts 14 which drive a clutch pulley 23 which is supported on the compressor shaft 12 by means of a ball bearing assembly 18. The arrangement is such that the pulley 23 is free to rotate relative to the shaft 12 when no refrigeration is required.

The clutch is of the self-energizing type shown in application Ser. No. 365,593 filed July 2, 1953 to which reference is made for a more detailed description of the clutch per se. The actuator for the clutch is a solenoid 24 which is secured to the compressor 10 as shown. The solenoid includes the usual armature 25 and coil 26 which is arranged to cause reciprocation of the armature when energized. The armature 25 carries a projection 27 which actuates a lever 29 having its one end pivoted to a fixed pin 31 as shown. This pin is carried by a rigid bracket 33 which in turn is fastened to the one end of the compressor housing by means of one or more bolts 35. The lever 29 is arranged to engage the clutch actuating plunger 34 which is biased by the spring 36 into clutching position.

The clutch pulley 23 is provided with a pair of drive surfaces 37 and 39 to be engaged by complementary driven surfaces 45 and 47 provided on clutch discs 41 and 43 as shown. The clutch disc 41 is longitudinally movable on and is keyed to the compressor shaft 12 and is engageable with the drive surfaces 37. The teaser or spread reaction clutch disc 43 is coaxial with said clutch disc 41 and is longitudinally movable on the compressor shaft 12 and is provided with a clutch surface engageable with the outer drive surface 39. Three or more equally spaced spreader means 40 are provided between the discs 41 and 43 which are activated by relative rotation of the disc 43 relative to the disc 41 as fully explained in said application Ser. No. 365,593. The spreaders 40 serve to force the discs 41 and 43 into clutching engagement with the drive surfaces 37 and 39 provided on the pulley 23.

The actuating lever 29 engages a spring pressed plunger 34 which has a shoulder 53 normally abutting against the one face of the disc 43. The plunger 34 is biased outwardly from the end of the compressor shaft 12 in which it is slidably and rotatably supported by means of a spring 36. A second collar 57 is provided on the plunger 34 and serves to engage the one side of the plate 43. As shown in the drawing, the solenoid coil 26 is arranged in series with the conventional car battery 60, a refrigerant pressure operated switch 62, a manually operated switch 64 and a thermostatic switch 66 which responds to the car air temperature and serves to control the clutch in response to refrigeration demands.

While the form of embodiment of the invention as herein disclosed constitutes a preferred form, it is to be understood that other forms might be adopted, as may come within the scope of the claims which follow.

What is claimed is as follows:

1. In a refrigerating system for use in an automobile or the like, an evaporator, a condenser, a compressor having a compressor operating shaft projecting therefrom, refrigerant flow connections between said evaporator, condenser, and compressor, a pulley rotatably supported on said shaft, self-energizing clutch means for transmitting power from said pulley to said shaft, a plunger for initiating operation of said self-energizing clutch means, said shaft having a central recess for supporting said plunger, first spring means biasing said plunger outwardly into clutch engaging position, second spring means biasing said plunger inwardly, means including a solenoid assisting said first spring means in overcoming the force of said second named spring means so as to cause engagement of said clutch upon energization of said solenoid, and means controlling the equalization of said solenoid including means responsive to air temperature and means responsive to the pressure within said refrigerating system.

2. In combination, a compressor having a compressor operating shaft projecting therefrom, a pulley rotatably supported on said shaft, self-energizing clutch means for transmitting power from said pulley to said shaft, a plunger for initiating operation of said self-energizing clutch means, said shaft having a central recess for supporting said plunger, first spring means biasing said plunger outwardly into clutch engaging position, second spring means biasing said plunger inwardly, means including a solenoid assisting said first spring means in overcoming the force of said second named spring means so as to cause engagement of said clutch upon energization of said solenoid, and means for controlling the operation of said solenoid.

3. In combination, a shaft, a pulley rotatably supported on said shaft, self-energizing clutch means for transmitting power from said pulley to said shaft, a plunger for initiating operation of said self-energizing clutch means, said shaft having a central recess for supporting said plunger, a first spring biasing said plunger outwardly into clutch engaging position, means including a solenoid for actuating said plunger, said actuator means including a second spring for opposing the force of said first named spring and said solenoid, said solenoid being arranged when energized to assist said first spring in overcoming the effect of said second spring so as to cause engagement of said clutch, said plunger actuating means comprising a rigid bracket, a lever pivotally mounted on said bracket and arranged to engage said plunger, and means for connecting said armature to one portion of said lever whereby reciprocation of said armature causes pivotal movement of said lever.

References Cited in the file of this patent

UNITED STATES PATENTS

| | | |
|---|---|---|
| Re. 19,858 | Fehr | Feb. 18, 1936 |
| 1,288,693 | Schaum | Dec. 24, 1918 |
| 2,130,855 | Oliver | Sept. 20, 1938 |
| 2,344,864 | Griswold | Mar. 21, 1944 |
| 2,375,854 | Lambert | May 15, 1945 |
| 2,392,572 | Briggs | Jan. 8, 1946 |
| 2,636,356 | Ryan | Apr. 28, 1953 |